Aug. 27, 1968     T. F. ANGGUIST     3,398,451
SPRING OPENED NIPPER
Filed June 27, 1966     2 Sheets-Sheet 1
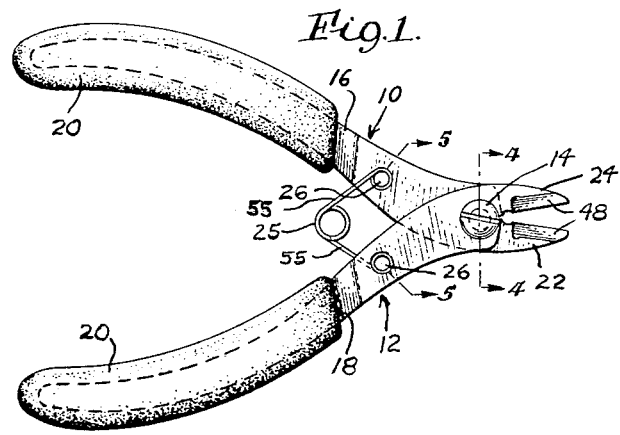
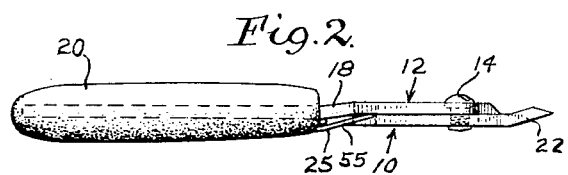
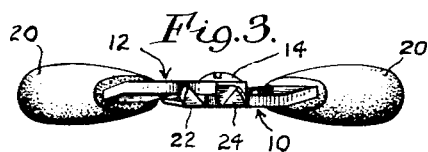
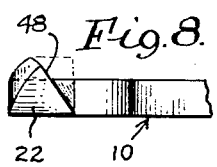
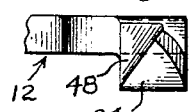
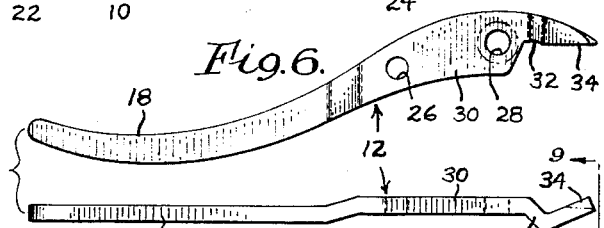
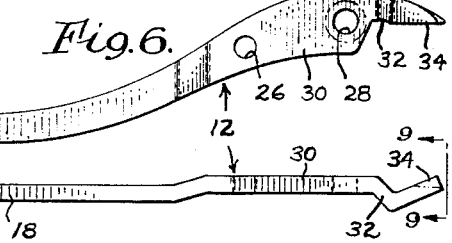
INVENTOR.
TORSTEN F. ANGGQUIST
BY
Bean, Brooks, Buckley & Bean
ATTORNEYS

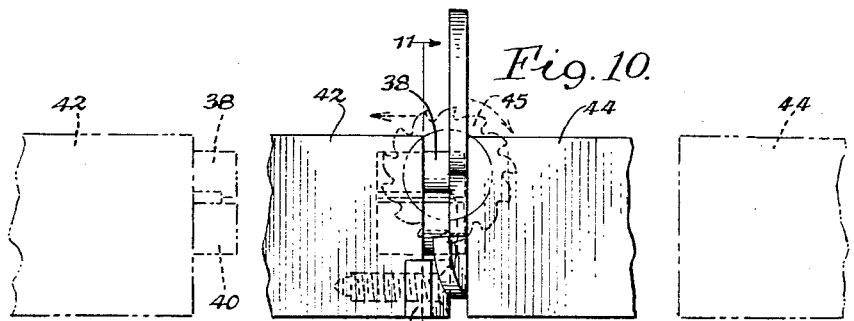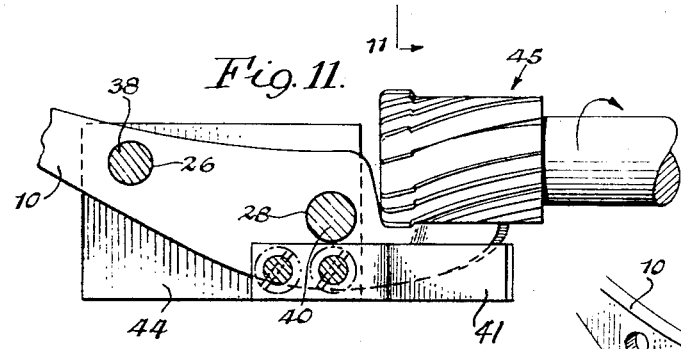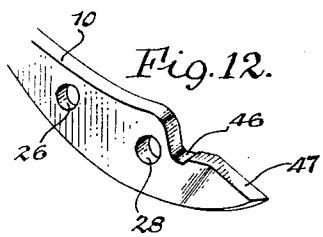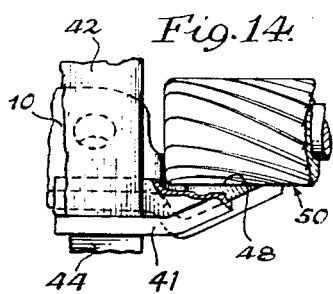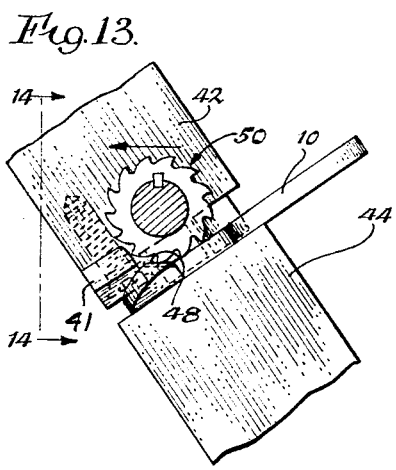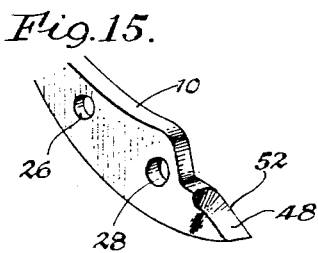

United States Patent Office 3,398,451
Patented Aug. 27, 1968

3,398,451
SPRING OPENED NIPPER
Torsten F. Angguist, Jamestown, N.Y., assignor to Crescent Niagara Corporation, Buffalo, N.Y.
Filed June 27, 1966, Ser. No. 560,543
3 Claims. (Cl. 30—186)

ABSTRACT OF THE DISCLOSURE

The arm members of a cutting plier are offset and nested to provide coplanar handle portions and side-by-side cutting jaws and a torsion spring is nested between the arm members in such position as to place it out of the way when the plier is operated.

---

Pliers of the above referenced type are widely used for fine wire cut-off purposes such as by operators assembling miniature electronic components interconnected by wire conductors or the like. A prime desideratum for such pliers is that they naturally fit into the hand of the operator and are so shaped as to not tend to slide or creep out of the operator's hand while being spring-actuated to automatically open instantaneously and smoothly upon release of squeezing pressures. Another prerequisite is that the cutting points at the nose of the tool must be slim and sharply pointed while at the same time being rugged and razor-sharp at their cutting edges.

It is a primary object of the present invention to provide a tool as aforesaid characterized by an improved "feel" to the hand, and an improved self-opening action.

Another object is to provide a tool as aforesaid having an improved cutting point construction whereby to work in restricted areas with improved facility.

Another object is to provide in a tool as aforesaid an improved spring mounting arrangement.

Still another object of the invention is to provide an improved tool as aforesaid by virtue of which certain manufacturing techniques may be advantageously employed in the fabrication of the tool parts.

Another object is to provide an improved method for fabricating the essential parts of the tool aforesaid.

Other objects and advantages of the invention will appear from the following specification and the accompanying drawing wherein:

FIG. 1 is a side elevational view of a diagonal plier of the present invention;

FIG. 2 is an edge elevational view of the plier of FIG. 1;

FIG. 3 is an end elevational view thereof;

FIGS. 4 and 5 are enlarged scale sectional views taken as indicated at lines 4—4 and 5—5 respectively of FIG. 1;

FIG. 6 shows a composite of side and edge elevational views of a work piece blank from which one arm of the plier is being fabricated;

FIG. 7 corresponds to FIG. 6 but illustrates the blank from which the other arm is being fabricated;

FIGS. 8 and 9 are fragmentary end views, on enlarged scale, taken as suggested by lines 8—8 and 9—9 of FIGS. 7 and 6, respectively;

FIG. 10 is a diagrammatic view illustrating the mounting of the formed blank of FIG. 7 in a vise preparatory to performance of a milling operation on the blank;

FIG. 11 is a view taken as suggested by line 11—11 of FIG. 10 and illustrating a first milling operation on the blank;

FIG. 12 is a fragmentary perspective view of the blank following the operation of FIG. 11;

FIG. 13 illustrates performance of a second milling operation on the blank of FIG. 12;

FIG. 14 is taken as suggested by line 14—14 of FIG. 13; and

FIG. 15 corresponds to FIG. 12 but illustrates the finished jaw formation.

As shown by way of example in the drawing herewith, the plier of the invention may be constructed to comprise essentially a pair of arm members designated generally at 10, 12, respectively, which are pivotally interconnected by means of a pivot screw 14. The arms 10, 12, are formed with smoothly curving handle portions 16, 18, preferably covered by plastic or rubber sleeves or the like as indicated at 20; the parts being shaped and dimensioned so as to smoothly and comfortably fit within the palm of the user's hand. At their other ends the arms 10, 12, are formed with cutting jaws 22, 24, respectively. A torsion spring 25 is anchored at its opposite ends in apertured portions 26—26 of the arms 10, 12, to automatically open the pliers whenever manual squeezing pressures thereon are relaxed.

It is a particular feature of the present invention that the arms 10, 12, are fabricated by first blanking them from sheet metal stock; then forming them into the shapes shown at FIGS. 6, 7; and then finally milling the cutting edges of the jaw portions as illustrated by way of example at FIGS. 10–14. Thus it will be appreciated that the members 10, 12, will be initially blanked out of flat sheet metal stock, preferably of the stainless steel type, so as to provide optimum hardness and wear and rust-resistant qualities. Incidental to the blanking process the aperture 26 is pierced through the stock piece as well as an aperture 28 for subsequent reception of the pivot pin 14. This provides an important facility assisting in the blank forming and machining operations to be subsequently performed because the blanked-out pieces may now be precisely located in holding jigs or the like when being subjected to the forming and machining steps.

For example, the blanks 10, 12, are next "formed" by means of a forming die into the edge view configurations shown at FIGS. 6, 7, whereby each arm member now includes an offset flat land portion 30 encompassing the areas of overlap of the members when subsequently pivotally connected together. Thus, on each arm the extending handle portion is edgewise offset from the plane of the central land portion. In the case of the member 12 the jaw portion is formed to include an inclined portion 32 (FIG. 6) and a reverse-bent inclined portion as indicated at 34. The member 10 at its jaw end portion is simply deflected to incline away from the plane of the flat land portion 30, as illustrated at 36 (FIG. 7). Thus the members are now shaped to interfit in overlapped pivoted relation as illustrated at FIGS. 1–3.

The blanked and formed members are now ready to be machined at their cutting jaw portions into the jaw point configurations illustrated at FIGS. 8, 9. To this end the blanks are readily slip-fitted upon positioning pins 38, 40, carried by a vise jaw 42; the other jaw of the vise being indicated at 44. Upon closure of the vise as illustrated at FIG. 10 the blank will then be accurately positioned by means of the locating pins (extending through the pierced apertures 26, 28) and firmly held between the jaws of the vise so that a milling cutter as illustrated at 45 may then be brought into operation to flat-mill the jaw edge as indicated at 46, 47 (FIG. 12). To produce the bevel cut on the jaw edge as illustrated at 48 (FIGS. 1, 8, 9, 13, 14, 15) the blank holding vise is then tilted and a milling cutter as illustrated at 50 (FIG. 13) is then brought into operation to bevel off the cutting jaw and to provide thereon a knife-edge as illustrated at 52 (FIG. 15).

It is a particular feature of the present invention that the spring-opening device of the plier is of such a form and is so mounted in the device as to be optimally effective as a spring unit while at the same time being so unobtrusively incorpoarted in the mechanism that the operator is unaware of its existence. This result is accomplished by simply piercing the apertures 26, 26, through the blanks 10, 12, as explained hereinabove and then providing the torsion spring 25 with helically coiled end portions 54—54 as best illustrated at FIG. 5 which are externally diametered so as to firmly squeeze-fit into the apertures 26, 26. The torsion spring 25 is thereby firmly locked at its opposite end in the arms 16, 18, while only single straight smooth leg portions of spring wire as indicated at 55, 55, lie against and overlap, and are thereby exposed over the levels of the interior surfaces of the land portions 30, 30. Thus, the spring 25 is thereby disposed in such an attitude as to operate with optimum mechanical advantage; while at the same time being practically "buried" between the handle members, and thereby being out of contact with the hand of the user.

The tool construction of the present invention lends itself patricularly to highly advantageous finishing and assembly techniques. For example, subsequent to completion of the milling operations on the jaw portions of the blanks as explained hereinabove, the parts may be rough-polished prior to relative assembly of the parts. The parts may be heat-treated either before or subsequent to assembly, as may be preferred. The finish-polishing and/or buffing operations may then be performed on the tool in accord with conventional practice; and the plastic sleeves or the like as indicated at 20 may then be provided thereon either by slip-fitting preformed sleeves thereon or by dipping the handle portions into a liquid plastic or rubber latex slurry, or the like, as may be preferred.

Thus it will be appreciated that the invention provides at once a finished product of superior handling and operative characteristics; the construction being of such nature as to be susceptible of fabrication of minimal and simple manufacturing techniques. No forging and concomitant machining operations are required to be performed on the parts, whereby substantial manufacturing economies may be effected and a superior product is made available to the industry.

Whereas the invention has been illustrated and described hereinabove only in connection with the manufacture of a plier of the diagonal cutting type, it is of course equally applicable to the manufacture of other type pliers. Hence, it will be understood that although only one specific embodiment of the invention has been illustrated and described herein by way of example, various changes may be made therein without departing from the spirit of the invention or the scope of the following claims.

I claim:
1. A hand tool of the plier type comprising, in combination,
   a pair of arm members each having a handle portion at one end and a flat land portion offset therefrom, the flat land portions being offset oppositely from each other and lying in face-to-face contact with said handle portions disposed in substantially coplanar relation, said arm members each having a jaw portion at its other end, the upper arm member having an inclined portion leading downwardly from the upper flat land portion to the level of the lower flat land portion and then inclining upwardly to define the associated jaw portion, the other jaw portions inclining upwardly from the lower flat land portion in side-by-side relation to the first jaw portion,
   means pivotally interconnecting said flat land portions adjacent said jaw portions,
   each flat land portion having an aperture adjacent its associated handle portion,
   and a torsion spring normally urging said arm members to jaw-open position, said spring having end portions anchored in said apertures, a bight portion nested between said arm members, and leg portions joining said end portions with said bight portion with one leg underlying said upper flat land portion and the other leg overlying the lower flat land portion whereby the entirety of said spring lies unobtrusively between said arm members.
2. The hand tool according to claim 1 wherein said end portions of the spring are in the form of coils frictionally received within said apertures.
3. The hand tool according to claim 2 wherein said bight portion is in the form of a coil with said leg portions issuing from the top and bottom thereof to lie in closely spaced relation to the respective upper and lower surfaces of said flat land portions.

References Cited

UNITED STATES PATENTS

| | | | |
|---|---|---|---|
| 1,840,358 | 1/1932 | Harvey | 30—186 X |
| 1,882,218 | 10/1932 | Harvey | 30—261 |
| 2,028,558 | 1/1936 | Nietzel et al. | 30—186 X |
| 2,046,642 | 7/1936 | Lynch | 30—261 X |
| 2,240,946 | 5/1941 | Vido | 30—254 |

ROBERT C. RIORDON, *Primary Examiner.*

J. C. PETERS, *Assistant Examiner.*